US010075303B2

(12) United States Patent
Li

(10) Patent No.: US 10,075,303 B2
(45) Date of Patent: Sep. 11, 2018

(54) METHOD AND APPARATUS FOR PERFORMING CHARGING CONTROL TO A SPONSORED DATA APPLICATION

(71) Applicant: Alcatel Lucent, Boulogne Billancourt (FR)

(72) Inventor: Xiangyang Li, Shanghai (CN)

(73) Assignee: Alcatel Lucent, Boulogne Billancourt (FR)

( * ) Notice: Subject to any disclaimer, the term of this patent is extended or adjusted under 35 U.S.C. 154(b) by 574 days.

(21) Appl. No.: 14/373,462

(22) PCT Filed: Jan. 21, 2013

(86) PCT No.: PCT/IB2013/000519
§ 371 (c)(1),
(2) Date: Jul. 21, 2014

(87) PCT Pub. No.: WO2013/108136
PCT Pub. Date: Jul. 25, 2013

(65) Prior Publication Data
US 2015/0003299 A1 Jan. 1, 2015

(30) Foreign Application Priority Data
Jan. 21, 2012 (CN) .......................... 2012 1 0019741

(51) Int. Cl.
H04L 12/26 (2006.01)
H04L 12/14 (2006.01)
H04M 15/00 (2006.01)

(52) U.S. Cl.
CPC ...... *H04L 12/1407* (2013.01); *H04L 12/1475* (2013.01); *H04M 15/61* (2013.01);
(Continued)

(58) Field of Classification Search
CPC ... H04M 15/66; H04M 15/64; H04L 12/1407; H04W 4/24
See application file for complete search history.

(56) References Cited

U.S. PATENT DOCUMENTS

2005/0021351 A1  1/2005 Koskinen et al.
2005/0271193 A1 12/2005 Koskinen et al.
(Continued)

FOREIGN PATENT DOCUMENTS

CN        1701591 A   11/2005
WO   WO 2004/004301 A1  1/2004
(Continued)

OTHER PUBLICATIONS

3rd Generation Partnership Project; Technical Specification Group Services and Aspects; Study on Policy solutions and enhancements (Release 11), SA WG2 V11.0.0, pp. 1-41, XP050552994, Jun. 2011.
(Continued)

Primary Examiner — Kevin C Harper
(74) Attorney, Agent, or Firm — Fay Sharpe, LLP

(57) ABSTRACT

An objective of the present invention is to provide a method and apparatus for performing charging control to a sponsored data application, receiving a service access request submitted by a user; determining a sponsored data application corresponding to the service access request based on a predetermined policy rule; transmitting a credit control request to a sponsored data charging device; receiving the credit control response returned from the sponsored data charging device, wherein the credit control response includes the charging control information corresponding to the service access request; redirecting the service access request to a network device corresponding to the sponsored data application based on the charging control information. Compared with the prior art, the present invention determines a corresponding sponsored data application based on
(Continued)

a service access request submitted by a user; further, corresponding charging control information is determined based on the sponsored data application, and a corresponding network device is redirected to based on the information; therefore, the present invention improves the accurate ratio and efficiency of the charging system.

15 Claims, 4 Drawing Sheets

(52) U.S. Cl.
CPC ........... *H04M 15/80* (2013.01); *H04L 43/028* (2013.01); *H04M 2215/0192* (2013.01)

(56) References Cited

U.S. PATENT DOCUMENTS

| | | | |
|---|---|---|---|
| 2006/0286963 A1 | 12/2006 | Koskinen et al. | |
| 2007/0281687 A1* | 12/2007 | Jiang | H04W 8/20 455/433 |
| 2008/0046963 A1* | 2/2008 | Grayson | H04L 12/66 726/1 |
| 2012/0099715 A1* | 4/2012 | Ravishankar | H04L 12/1407 379/114.01 |
| 2012/0158829 A1* | 6/2012 | Ahmavaara | H04L 63/101 709/203 |
| 2013/0007286 A1* | 1/2013 | Mehta | H04W 76/02 709/227 |
| 2013/0212265 A1* | 8/2013 | Rubio Vidales | H04L 12/14 709/224 |

FOREIGN PATENT DOCUMENTS

| | | |
|---|---|---|
| WO | 2010112080 A1 | 10/2010 |
| WO | 2011057672 A1 | 5/2011 |
| WO | WO 2012/080793 A1 | 6/2012 |

OTHER PUBLICATIONS

International Search Report for PCT/IB2013/000519 dated Jun. 7, 2013.
English Bibliography for Chinese Patent Application Publication No. CN1701591A, published Nov. 23, 2005, printed from Thomson Innovation on Aug. 6, 2015, 4 pp.
PCT Pat. App. No. PCT/IB2013/000519, Written Opinion of the International Searching Authority, dated Jun. 7, 2013, 7 pp.
3GPP TS 23.203, version 10.5.0, Release 10; ETSI TS 123 203 V10.5.0 (Jan. 2012) "Digital cellular telecommunications system (Phase 2+); Universal Mobile Telecommunications System (UMTS); LTE."

\* cited by examiner

METHOD AND APPARATUS FOR PERFORMING CHARGING CONTROL TO A SPONSORED DATA APPLICATION

FIELD OF THE INVENTION

The present invention relates to the field of communications technology, and more specifically, to a technology of performing charging control to a sponsored data application.

BACKGROUND OF THE INVENTION

With the expedite development of mobile communications technologies in the high-speed broadband data access field, in multi-media multi-task smart phones/tablets, and in cloud computation-based applications, an end user can conveniently access or download applications via a mobile terminal anywhere and anytime. Since more and more service providers attract users' eyeballs by providing massive applications, operators desire to perform charging control to corresponding data.

Therefore, a sponsored data charging model between a network operator and a service provider emerges. In this model, the service provider attracts users to pay for the applications downloaded from the service provider, instead of directly paying the network operator. The service provider shares the payments from those users with the network operator to compensate the network operator for the broadband network provided for downloading these application data.

In the prior art, 3GPP introduces the Policy and Charging Control (PCC) technology to assist the network operator to control and management the network bandwidth so as to protect its particular resources in the network. However, the existing PCC architecture cannot be well adapted to the sponsored data charging model. The PCC architecture can only allow the operator to control data service connections of its own subscribers, but cannot well address the issue of how to perform policy and charging control for the subscriber's data service connections.

Therefore, it becomes an imminent problem to solve how to perform charging control to a sponsored data application so as to enhance the accurate ratio and efficiency of the charging system.

SUMMARY OF THE INVENTION

An objective of the present invention is to provide a method and apparatus for performing charging control to a sponsored data application.

According to one aspect of the present invention, there is provided a method for performing charging control to a sponsored data application based on Policy and Charging Control architecture, wherein the method comprises:
 a. receiving a service access request submitted by a user;
 b. determining a sponsored data application corresponding to the service access request based on a predetermined policy rule;
 c. transmitting a credit control request to a sponsored data charging device, wherein the credit control request includes identification information of the sponsored data application;
 d. receiving the credit control response returned from the sponsored data charging device, wherein the credit control response includes the charging control information corresponding to the service access request;
 e. redirecting the service access request to a network device corresponding to the sponsored data application based on the charging control information.

Preferably, the method further comprises:
 determining a trigger condition for transmitting to the sponsored data charging device a credit control update request corresponding to the service access request based on the charging control information;
 inspecting whether the trigger condition is satisfied;
 transmitting the credit control update request to the sponsored data charging device when the trigger condition is satisfied;
 receiving the credit control update response returned from the sponsored data charging device based on the credit control update request, wherein the credit control response includes charging control update information corresponding to the service access request.

More preferably, the trigger condition comprises at least one of the following items:
 the user's access to the sponsored data application exceeds a predetermined access time period;
 the user's account balance being lower than a predetermined threshold;
 the IP address corresponding to the user bing not in a list of allowed accesses.

According to another aspect of the present invention, there is further provided a method for performing charging control to a sponsored data application based on Policy and Charging Control architecture, wherein the method comprises:
 A. receiving a credit control request transmitted from a deep packet inspection device, wherein the credit control request includes identification information of a sponsored data application;
 B. determining charging control information of a service access request corresponding to the sponsored data application based on a predetermined rule for sponsored services corresponding to the credit control request;
 C. transmitting a credit control response corresponding to the credit control request to the deep packet inspection device, wherein the credit control response includes the charging control information.

Preferably, the step B comprises any one of the following items:
 if the service access request matches the rule for sponsored services, determining the charging control information, wherein the charging control information includes sponsored application charging information corresponding to the sponsored data application;
 if the service access request mismatches the rule for sponsored services, transmitting a credit control request about the charging control information to an OCS, and receiving the charging control information which is fed back by the OCS based on the credit control request.

Preferably, the method further comprises:
 receiving a credit control update request transmitted from the deep packet inspection device;
 determining charging control update information corresponding to the credit control update request based on the credit control update request in combination with the predetermined rule for sponsored services;
 a second response transmitting module configured to transmit a credit control update response corresponding to the credit control update request to the deep packet inspection device, wherein the credit control update response includes the charging control update information.

According to a further aspect of the present invention, there is further provided a deep packet inspection device for performing charging control to a sponsored data application based on Policy and Charging Control architecture, wherein the deep packet inspection device comprises:

a first request receiving module configured to receive a service access request submitted by a user;

an application determining module configured to determine a sponsored data application corresponding to the service access request based on a predetermined policy rule;

a first request transmitting module configured to transmit a credit control request to a sponsored data charging device, wherein the credit control request includes identification information of the sponsored data application;

a first response receiving module configured to receive the credit control response returned from the sponsored data charging device, wherein the credit control response includes the charging control information corresponding to the service access request;

a redirecting module configured to redirect the service access request to a network device corresponding to the sponsored data application based on the charging control information.

Preferably, the deep packet inspection device further comprises:

a trigger condition determining module configured to determine a trigger condition for transmitting to the sponsored data charging device a credit control update request corresponding to the service access request based on the charging control information;

an inspection module configured to inspect whether the trigger condition is satisfied;

a second request transmitting module configured to transmit the credit control update request to the sponsored data charging device when the trigger condition is satisfied;

a second response receiving module configured to receive the credit control update response returned from the sponsored data charging device based on the credit control update request, wherein the credit control response includes charging control update information corresponding to the service access request.

More preferably, the trigger condition comprises at least one of the following items:

the user's access to the sponsored data application exceeds a predetermined access time period;

the user's account balance being lower than a predetermined threshold;

the IP address corresponding to the user bing not in a list of allowed accesses.

According to a further aspect of the present invention, there is further provided a PGW for performing charging control to a sponsored data application based on Policy and Charging Control architecture, comprising the deep packet inspection device above.

According to another aspect of the present invention, there is further provided a sponsored data charging device for performing charging control to a sponsored data application based on Policy and Charging Control architecture, wherein the sponsored data charging device comprises:

a second request receiving module configured to receive a credit control request transmitted from a deep packet inspection device, wherein the credit control request includes identification information of a sponsored data application;

a charging control determining module configured to determine charging control information of a service access request corresponding to the sponsored data application based on a predetermined rule for sponsored services corresponding to the credit control request;

a first response transmitting module configured to transmit a credit control response corresponding to the credit control request to the deep packet inspection device, wherein the credit control response includes the charging control information.

Preferably, the charging control determining module performs any one of the following operations:

if the service access request matches the rule for sponsored services, determining the charging control information, wherein the charging control information includes sponsored application charging information corresponding to the sponsored data application;

if the service access request mismatches the rule for sponsored services, transmitting a credit control request about the charging control information to an OCS, and receiving the charging control information which is fed back by the OCS based on the credit control request.

Preferably, the sponsored data charging device further comprises:

a third request receiving module configured to receive a credit control update request transmitted from the deep packet inspection device;

a charging update obtaining module configured to determine charging control update information corresponding to the credit control update request based on the credit control update request in combination with the predetermined rule for sponsored services;

a second response transmitting module configured to transmit a credit control update response corresponding to the credit control update request to the deep packet inspection device, wherein the credit control update response includes the charging control update information.

According to a further aspect of the present invention, there is further provided an OCS for performing charging control to a sponsored data application based on Policy and Charging Control architecture, comprising the sponsored data charging device above.

According to a further aspect of the present invention, there is further provided a system for performing charging control to a sponsored data application based on Policy and Charging Control architecture, comprising the deep packet detection device above, and the sponsored data charging device above.

Compared with the prior art, the present invention introduces a deep packet inspection device and a sponsored data charging device to extend the PCC architecture; a corresponding sponsored data application is determined based on a service access request submitted by a user; further, corresponding charging control information is determined based on the sponsored data application, and a corresponding network device is redirected to based on the information; therefore, the present invention realizes real-time monitoring and charging to the sponsored data application and improves the accurate ratio and efficiency of the charging system.

BRIEF DESCRIPTION OF THE SEVERAL VIEWS OF THE DRAWINGS

Other features, objectives and advantages of the present invention will become more apparent through reading the detailed description of the non-limiting embodiments with reference to the following accompanying drawings.

Same or like reference numerals in the figures represent the same or like components.

DETAILED DESCRIPTION OF THE INVENTION

Hereinafter, the present invention will be further described in detail with reference to the accompanying drawings.

Figure 1:
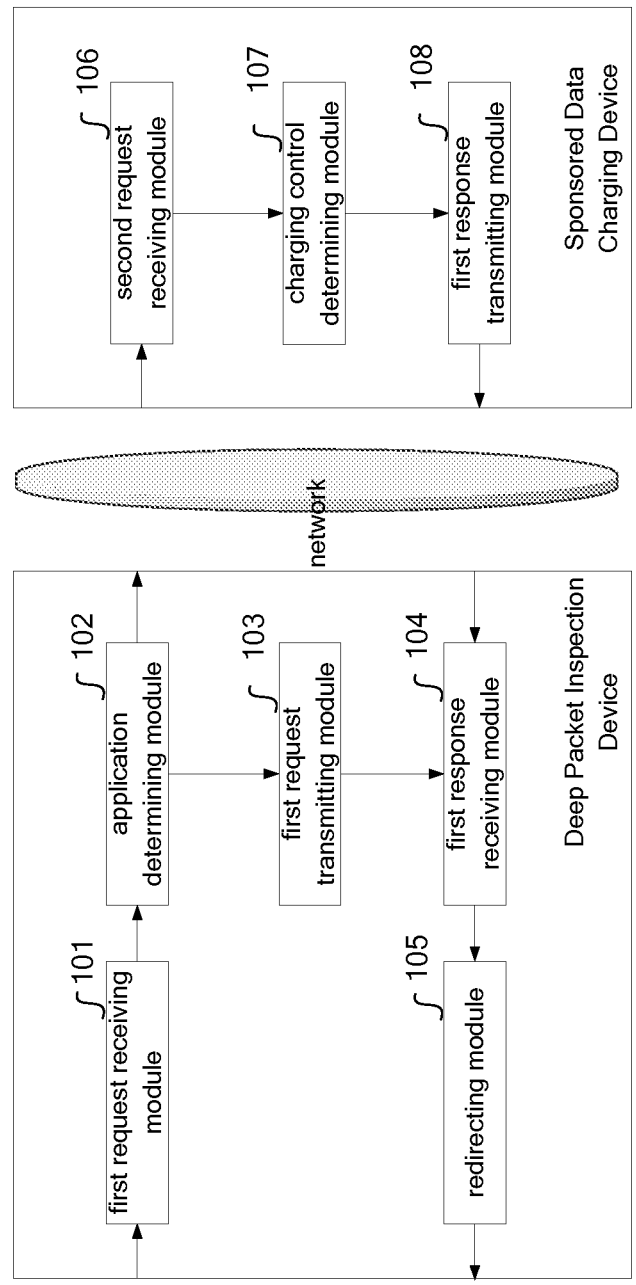
FIG. 1 shows a schematic diagram of a device for performing charging control to a sponsored data application according to one aspect of the present invention.

FIG. 1 shows a schematic diagram of a device for performing charging control to a sponsored data application according to one aspect of the present invention. The system comprises a Deep Packet Inspection (DPI) device and a Sponsored Data Charging Server (SDCS) device; the DPI comprises a first request receiving module 101, an application determining 102, a first request transmitting module 103, and a first response receiving module, and a redirecting module 105; the SDCS comprises a second request receiving module 106, a charging control determining module 107, and a first response transmitting module 108.

The first request receiving module 101 in the DPI receives a service access request submitted by a subscriber. For example, the subscriber submits the service access request by clicking onto a corresponding application icon or a page button for a relevant page in the mobile terminal; when the DPI is located in a gateway, for example, in PGW, the DPI interacts with the mobile terminal, such that the first request receiving module 101 in the DPI obtains the service access request submitted by the subscriber; or if the DPI is an independent device, the DPI interacts with a gateway such as PGW, such that the first request receiving module 101 in the DPI obtains the service access request submitted by the subscriber.

The application determining module 102 determines a sponsored data application corresponding to the service access request based on a predetermined policy rule. Specifically, the application determining module 102 determines a sponsored data application corresponding to the service access request based on the service access request received by the first request receiving module 101 in accordance with a predetermined policy rule, for example, inspecting the sponsored data application based on a policy rule received from a Partnership Management System (PMS), for example, inspecting the use traffic of the sponsored data application.

Here, the PMS manages sponsored data provided by different third-party service providers for the operation network and provides a policy rule, a rule for sponsored services, and a price list of sponsored data to a responsive device. Here, the network assigns a dedicated bearer path or data channel to these sponsored data application. The sponsored data applications will be directed to the third-party service provider from the dedicated data channel. The dedicated data channel for the sponsored data application is "free" in the gateway PGW, i.e., the PGW will not monitor or report the sponsored data application. If the DPI is independent, the DPI will monitor the sponsored data application through the dedicated data channel so as to alleviate the burden of the PGW. The DPI matches the inspection information of the sponsored data application with the predetermined policy rule and monitors the use traffic of each sponsored data application through the dedicated data channel. Here, the DPI reports the data traffic use condition of the sponsored data application to the SDCS in real-time.

The first request transmitting module 103 transmits a credit control request to the SDCS, wherein the credit control request includes identification information of the sponsored data application. Specifically, the first request transmitting module 103 obtains the identification information of the sponsored data application based on the sponsored data application determined by the application determining module 102; further, the first request transmitting module generates a credit control request by writing the identification information into a particular field of the credit control request and transmits the request to the SDCS.

The second request receiving module 106 in the SDCS receives a credit control request transmitted from the DPI, wherein the credit control request includes identification information of the sponsored data application.

The charging control determining module 107 determines charging control information of the service access request corresponding to the sponsored data application based on a predetermined rule for sponsored services corresponding to the credit control request. Specifically, the charging control determining module 107 performs any one of the following operations:

if the service access request matches the rule for sponsored services, determining the charging control information, wherein the charging control information includes sponsored application charging information corresponding to the sponsored data application;

if the service access request mismatches the rule for sponsored services, transmitting the credit control request about the charging control information to an online charging system OCS, and receiving the charging control information which is fed back by the OCS based on the credit control request, wherein the OCS charges a non-sponsored data application corresponding to the service access request.

For example, the charging control determining module 107 parses out the identification information of the sponsored data application from the particular field of the request based on the credit control request that is transmitted from the DPI and received by the second request receiving module; if they match, the sponsored application charging information corresponding to the sponsored data application is determined; if they mismatch, a credit control request about the charging control information is transmitted to the OCS that determines the corresponding charging control information and returns it to the SDCS.

Here, if the service access request mismatches the rule for sponsored services, for example, the service access request exceeds the predetermined access period, the IP address corresponding to the subscriber is not in a list of allowed accesses or if the remaining traffic of the user is lower than an available threshold, it may be regarded that the data application corresponding to the service access request is a non-sponsored data application, i.e., the subscriber has to pay the data application, and the OCS charges the non-sponsored data application based on the existing charging control rule. The PGW will only report common data use traffic to the OCS through the Gy reference point.

Here, the rule for sponsored services, for example, may be determined based on an IP address range, a protocol, a URL, an application ID, etc., or a combination thereof; or may be determined further in combination with a price list ID of the subscriber, a sponsor time period, a traffic threshold, or other information, or a combination thereof. The above information, for example, may be provided by PMS to the SDCS, including, but not limited to, device type, mobile MDN/MSIDSN prefix or number range, IMSI prefix, access point name, access technology type, service identifier, service type, application type, location information, roam information, time, date, traffic use threshold, IP address range, etc.

Examples of some rules for sponsored services are provided below:

1) Location-Based Sponsored Data Application

When the end user accesses a data service of a third-party service provider in a home network, the service data will be sponsored by the third-party service provider; if the end user roams within a network or at a particular location beyond the home network, the data service will not be sponsored by the third-party service provider, and the end user has to pay a corresponding data service connection fee to the network operator.

2) IP Address Range-Based Sponsored Data Application

The third-party service provider has an agreement with the network operator that any traffic caused by any end user with an IP address range between x and y accessing the network operator should be sponsored, and the end user will not be charged for such traffic.

3) Time Range-Based Sponsored Data Application

The third-party service provider has an agreement with the network operator that any traffic caused by any end user accessing the network operator within a designated time period should be sponsored, and the end user will not be charged for such traffic.

4) Traffic Use Constraint-Based Sponsored Data Application

The third-party service provider has an agreement with the network operator that for any end user, as long as his/her total traffic use within one month is less than 1 GB, his/her any traffic for accessing the network operator should be sponsored; when the terminal user exhausts the 1 GB traffic, he/she should pay corresponding data service connection fee to the network operator.

The first response transmitting module 108 transmits a credit control response corresponding to the credit control request to the DPI, wherein the credit control response includes the charging control information. Specifically, the first response transmitting module 108 generates a credit control response based on the charging control information determined by the charging control determining module 107 through writing the charging control information into a particular field of the credit control field, and further, the credit control response is transmitted to the DPI through the Gy reference point.

The first response receiving module 104 in the DPI receives the credit control response returned from the sponsored data charging device, wherein the credit control response includes the charging control information corresponding to the service access request.

The redirecting module 105 redirects the service access request to a network device corresponding to the sponsored data application based on the charging control information. For example, when the charging control information returned from the SDCS includes the user's charging quota for the sponsored data application, for example, 200 MB, then the redirecting module 105 redirects the service access request to the network device corresponding to the sponsored data application such that the user accesses the sponsored data application. Or, when the charging quota included in the charging control information returned from the SDCS is zero, the redirecting module 105 will not redirect the service access request to the corresponding network device, but terminates the session.

In the present invention, use of a non-sponsored data application is managed and controlled by an existing OCS, while use of a sponsored data application is managed and controlled by the SDCS introduced in the present invention; therefore, the sponsored data application will not be managed by a common traffic user charger and will not be paid by the user either. Therefore, the present invention effectively avoids double charging a sponsored data application.

In a preferred embodiment, the DPI further comprises a trigger condition determining module, an inspection module, a second request transmitting module, and a second response receiving module; and the SDCS further comprises a third request receiving module, a charging update obtaining module, and a second response transmitting module, all of which are not shown in the figures.

The trigger condition determining module in the DPI determines a trigger condition for transmitting to the sponsored data charging device a credit control update request corresponding to the service access request based on the charging control information. Specifically, the SDCS may write a corresponding rule for sponsored services and information such as IP address range, sponsored time period, traffic threshold, etc., into the charging control information when transmitting the charging control information to the DPI; after the DPI receives the charging control information, the trigger condition determining module thereon determines a trigger condition for transmitting to the sponsored data charging device a credit control update request corresponding to the service access request based on the above information or a combination thereof. Here, the trigger condition comprises, but not limited to, any one of the following items:

the user's access to the sponsored data application exceeds a predetermined access time period;

the user's account balance being lower than a predetermined threshold;

the IP address corresponding to the user being not in a list of allowed accesses.

For example, if the predetermined access time period is 10:00-12:00, when the user's access to the sponsored data application exceeds the predetermined access time period, then DPI should transmit a corresponding credit control update request to the SDCS.

Those skilled in the art should understand that the above trigger condition is only exemplary, and other existing or possibly evolved trigger conditions in the future, if applicable to the present invention, should also be included within the protection scope of the present invention, which are incorporated here by reference.

The inspection module inspects whether the trigger condition is satisfied. Here, the inspection module constantly inspects each sponsored data application to inspect and determine whether the above trigger condition is satisfied.

When the trigger condition is satisfied, the second request transmitting module transmits the credit control update request to the sponsored data charging device. Here, the credit control update request includes a result of inspecting the sponsored data application.

The third request receiving module in the SDCS receives a credit control update request transmitted from the deep packet inspection device.

The charging update obtaining module determines charging control update information corresponding to the credit control update request based on the credit control update request in combination with the predetermined rule for sponsored services. Here, the charging update obtaining module extracts the inspection result for the sponsored data application from the particular field of the credit control update request, and further, in further combination with the predetermined rule for sponsored services, determines whether the credit control update request corresponds to a sponsored data application or to a non-sponsored data application, and then, directly determines the corresponding charging control update information, or transmits it to the OCS to charge the non-sponsored data application.

The second response transmitting module generates a corresponding credit control update response based on the charging control update information obtained by the charging update obtaining module through writing the information into a particular field of the credit control update response, and further, returns the credit control update response to the DPI.

The second response receiving module in the DPI receives the credit control update response returned from the sponsored data charging device based on the credit control update request, wherein the credit control response includes the charging control update information corresponding to the service access request.

Preferably, the deep packet inspection device may be independent or located in a gateway (PGW).

Preferably, the sponsored data charging device may be independent or located in an Online Charging System (OCS).

Preferably, the present invention may further introduce a Revenue Sharing and Settlement System (RSSS); the RSSS receives from the PMS a price list of sponsored data between a network operator and a third-party service provider and in combination with the charging control information from the SDCS, determines the accounts of the third-party service provider.

Figure 2:
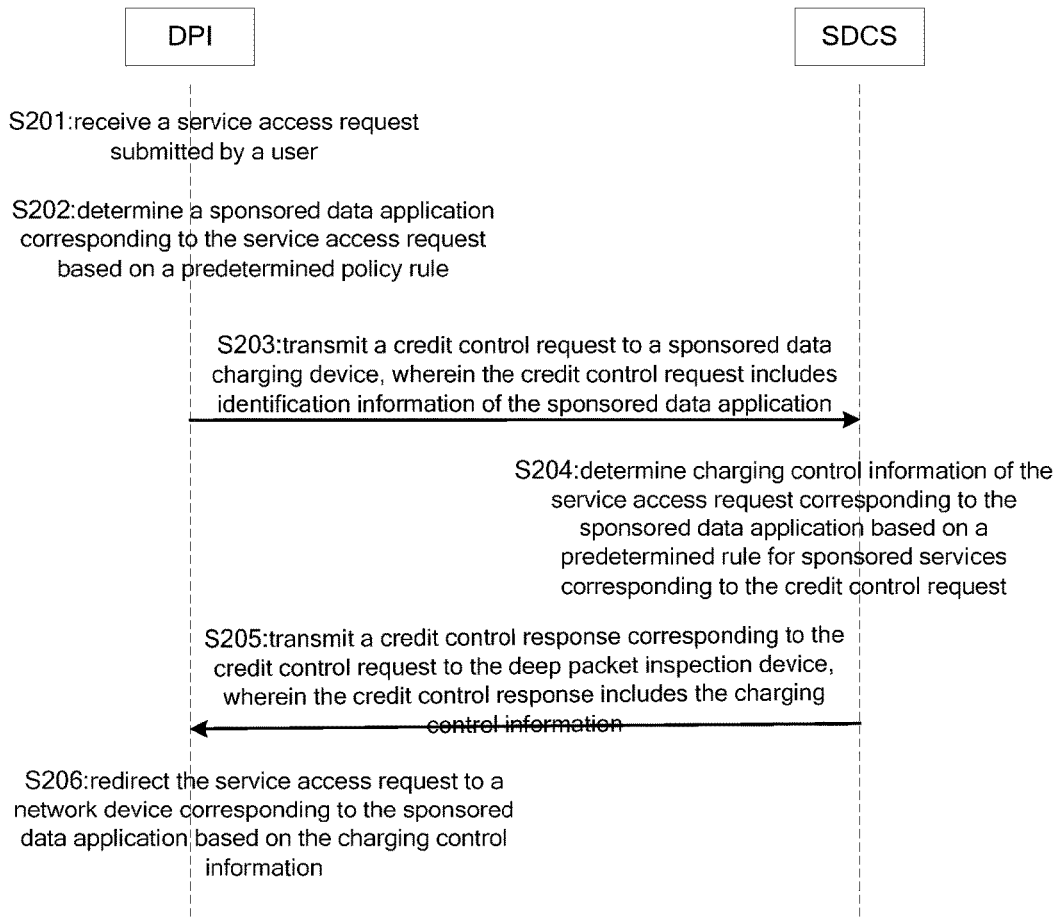
FIG. 2 shows a flowchart of a method for performing charging control to a sponsored data application according to another aspect of the present invention.

FIG. 2 shows a flowchart of a method for performing charging control to a sponsored data application according to another aspect of the present invention.

In step 201, the DPI receives a service access request submitted by a subscriber. For example, the subscriber submits the service access request by clicking onto a corresponding application icon or a page button for a relevant page in the mobile terminal; when the DPI is located in a gateway, for example, in PGW, the DPI interacts with the mobile terminal, such that in step 201 the DPI obtains the service access request submitted by the subscriber; or if the DPI is an independent device, the DPI interacts with a gateway such as PGW, such that in step 201 the DPI obtains the service access request submitted by the subscriber.

In step 202, the DPI determines a sponsored data application corresponding to the service access request based on a predetermined policy rule. Specifically, in step 202, the DPI determines a sponsored data application corresponding to the service access request based on the service access request received in step 201 in accordance with a predetermined policy rule, for example, inspecting the sponsored data application based on a policy rule received from a Partnership Management System (PMS), for example, inspecting the use traffic of the sponsored data application.

Here, the PMS manages sponsored data provided by different third-party service providers for the operation network and provides a policy rule, a rule for sponsored services, and a price list of sponsored data to a responsive device. Here, the network assigns a dedicated bearer path or data channel to these sponsored data application. The sponsored data applications will be directed to the third-party service provider from the dedicated data channel. The dedicated data channel for the sponsored data application is "free" in the gateway PGW, i.e., the PGW will not monitor or report the sponsored data application. If the DPI is independent, the DPI will monitor the sponsored data application through the dedicated data channel so as to alleviate the burden of the PGW. The DPI matches the inspection information of the sponsored data application with the predetermined policy rule and monitors the use traffic of each sponsored data application through the dedicated data channel. Here, the DPI reports the data traffic use condition of the sponsored data application to the SDCS in real-time.

In step 203, the DPI transmits a credit control request to the SDCS, wherein the credit control request includes identification information of the sponsored data application. Specifically, in step 203, the DPI obtains the identification information of the sponsored data application based on the sponsored data application determined in step 202; further, generates a credit control request by writing the identification information into a particular field of the credit control request and transmits the request to the SDCS.

The SDCS receives a credit control request transmitted from the DPI, wherein the credit control request includes identification information of the sponsored data application.

In step 204, the SDCS determines charging control information of the service access request corresponding to the sponsored data application based on a predetermined rule for sponsored services corresponding to the credit control request. Specifically, in step 204, the SDCS performs any one of the following operations:

if the service access request matches the rule for sponsored services, determining the charging control information, wherein the charging control information includes sponsored application charging information corresponding to the sponsored data application;

if the service access request mismatches the rule for sponsored services, transmitting the credit control request about the charging control information to an online charging system OCS, and receiving the charging control information which is fed back by the OCS based on the credit control request, wherein the OCS charges a non-sponsored data application corresponding to the service access request.

For example, in step 204, the SDCS parses out the identification information of the sponsored data application from the particular field of the request based on the credit control request that is transmitted from the DPI and received in step 203; if they match, the sponsored application charging information corresponding to the sponsored data application is determined; if they mismatch, a credit control request about the charging control information is transmitted to the OCS that determines the corresponding charging control information and returns it to the SDCS.

Here, if the service access request mismatches the rule for sponsored services, for example, the service access request exceeds the predetermined access period, the IP address corresponding to the subscriber is not in a list of allowed accesses or if the remaining traffic of the user is lower than an available threshold, it may be regarded that the data application corresponding to the service access request is a non-sponsored data application, i.e., the subscriber has to pay the data application, and the OCS charges the non-sponsored data application based on the existing charging control rule. The PGW will only report common data use traffic to the OCS through the Gy reference point.

Here, the rule for sponsored services, for example, may be determined based on an IP address range, a protocol, a URL, an application ID, etc., or a combination thereof; or may be determined further in combination with a price list ID of the subscriber, a sponsor time period, a traffic threshold, or other information, or a combination thereof. The above information, for example, may be provided by PMS to the SDCS, including, but not limited to, device type, mobile MDN/MSIDSN prefix or number range, IMSI prefix, access point name, access technology type, service identifier, service type, application type, location information, roam information, time, date, traffic use threshold, IP address range, etc.

Examples of some rules for sponsored services are provided below:

1) Location-Based Sponsored Data Application

When the end user accesses a data service of a third-party service provider in a home network, the service data will be sponsored by the third-party service provider; if the end user roams within a network or at a particular location beyond the home network, the data service will not be sponsored by the third-party service provider, and the end user has to pay a corresponding data service connection fee to the network operator.

2) IP Address Range-Based Sponsored Data Application

The third-party service provider has an agreement with the network operator that any traffic caused by any end user with an IP address range between x and y accessing the network operator should be sponsored, and the end user will not be charged for such traffic.

3) Time Range-Based Sponsored Data Application

The third-party service provider has an agreement with the network operator that any traffic caused by any end user accessing the network operator within a designated time period should be sponsored, and the end user will not be charged for such traffic.

4) Traffic Use Constraint-Based Sponsored Data Application

The third-party service provider has an agreement with the network operator that for any end user, as long as his/her total traffic use within one month is less than 1 GB, his/her any traffic for accessing the network operator should be sponsored; when the terminal user exhausts the 1 GB traffic, he/she should pay corresponding data service connection fee to the network operator.

In step 205, the SDCS transmits a credit control response corresponding to the credit control request to the DPI, wherein the credit control response includes the charging control information. Specifically, in step 205, the SDCS generates a credit control response based on the charging control information determined in step 204 through writing the charging control information into a particular field of the credit control field, and further, the credit control response is transmitted to the DPI through the Gy reference point.

The DPI receives the credit control response returned from the sponsored data charging device, wherein the credit control response includes the charging control information corresponding to the service access request.

In step 206, the DPI redirects the service access request to a network device corresponding to the sponsored data application based on the charging control information. For example, when the charging control information returned from the SDCS includes the user's charging quota for the sponsored data application, for example, 200 MB, then in step 206, the SDCS redirects the service access request to the network device corresponding to the sponsored data application such that the user accesses the sponsored data application. Or, when the charging quota included in the charging control information returned from the SDCS is zero, in step 206, the SDCS will not redirect the service access request to the corresponding network device, but terminates the session.

In the present invention, use of a non-sponsored data application is managed and controlled by an existing OCS, while use of a sponsored data application is managed and controlled by the SDCS introduced in the present invention; therefore, the sponsored data application will not be managed by a common traffic user charger and will not be paid by the user either. Therefore, the present invention effectively avoids double charging a sponsored data application.

In a preferred embodiment, the method further comprises steps 207-211; all the steps above are not shown in the figures.

In step 207, the DPI determines a trigger condition for transmitting to the sponsored data charging device a credit control update request corresponding to the service access request based on the charging control information. Specifically, the SDCS may write a corresponding rule for sponsored services and information such as IP address range, sponsored time period, traffic threshold, etc., into the charging control information when transmitting the charging control information to the DPI; after the DPI receives the charging control information, in step 207, the DPI thereon determines a trigger condition for transmitting to the sponsored data charging device a credit control update request corresponding to the service access request based on the above information or a combination thereof. Here, the trigger condition comprises, but not limited to, any one of the following items:

the user's access to the sponsored data application exceeds a predetermined access time period;

the user's account balance being lower than a predetermined threshold;

the IP address corresponding to the user being not in a list of allowed accesses.

For example, if the predetermined access time period is 10:00-12:00, when the user's access to the sponsored data application exceeds the predetermined access time period, then DPI should transmit a corresponding credit control update request to the SDCS.

Those skilled in the art should understand that the above trigger condition is only exemplary, and other existing or possibly evolved trigger conditions in the future, if applicable to the present invention, should also be included within the protection scope of the present invention, which are incorporated here by reference.

In step 208, the DPI inspects whether the trigger condition is satisfied. Here, in step 208, the DPI constantly inspects each sponsored data application to inspect and determine whether the above trigger condition is satisfied.

When the trigger condition is satisfied, in step 209, the DPI transmits the credit control update request to the sponsored data charging device. Here, the credit control update request includes a result of inspecting the sponsored data application.

The SDCS receives a credit control update request transmitted from the deep packet inspection device.

In step 210, the SDCS determines charging control update information corresponding to the credit control update request based on the credit control update request in combination with the predetermined rule for sponsored services. Here, in step 210, the SDCS extracts the inspection result for the sponsored data application from the particular field of the credit control update request, and further, in further combination with the predetermined rule for sponsored services, determines whether the credit control update request corresponds to a sponsored data application or to a non-sponsored data application, and then, directly determines the corresponding charging control update information, or transmits it to the OCS to charge the non-sponsored data application.

In step 211, the SDCS generates a corresponding credit control update response based on the charging control update information obtained in step 210 through writing the information into a particular field of the credit control update response, and further, returns the credit control update response to the DPI.

The DPI receives the credit control update response returned from the sponsored data charging device based on the credit control update request, wherein the credit control response includes the charging control update information corresponding to the service access request.

Figure 3:
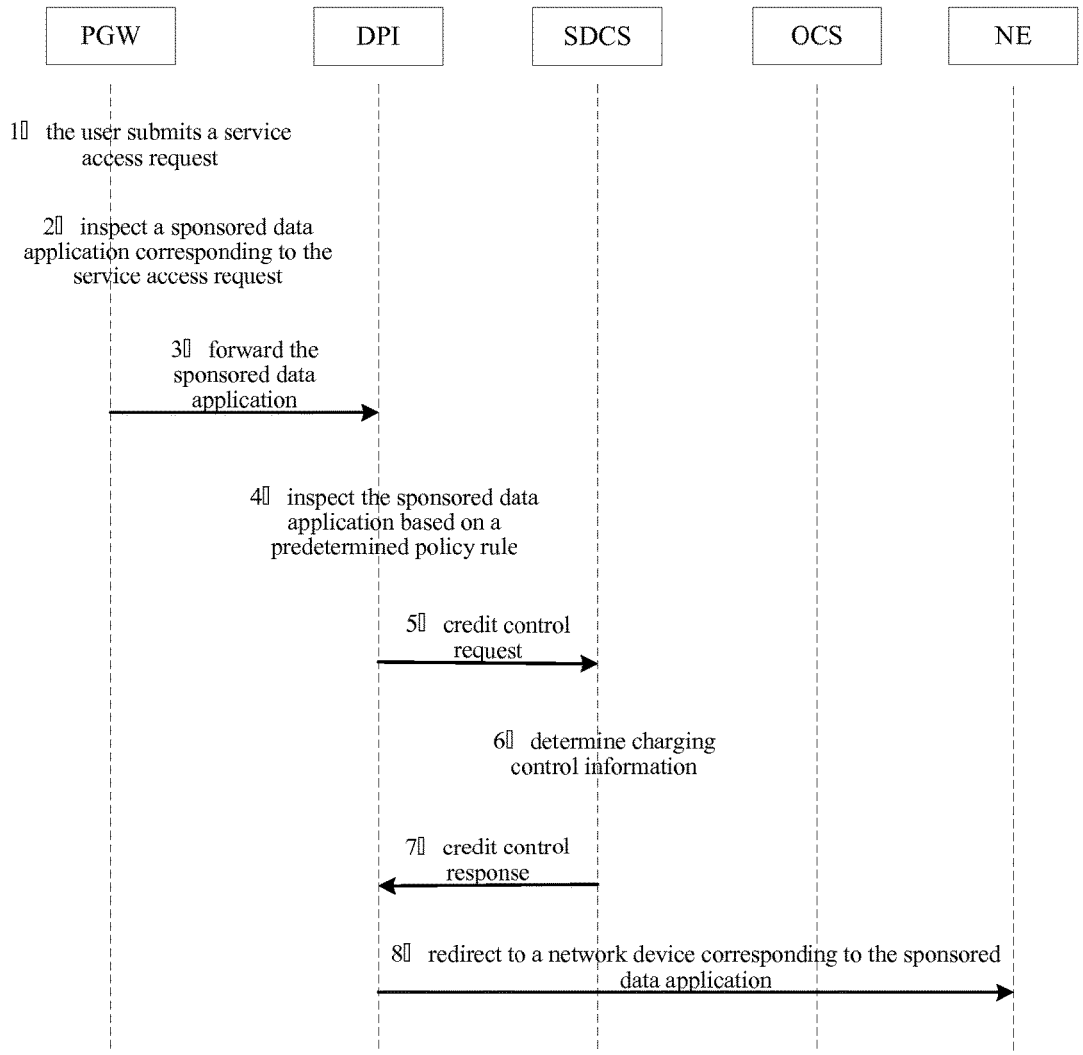
FIG. 3 shows a flowchart of a method for performing charging control to a sponsored data application according to one preferred embodiment of the present invention.

FIG. 3 shows a flowchart of a method for performing charging control to a sponsored data application according to one preferred embodiment of the present invention. FIG. 3 shows the following scenario: the third-party service provider has an agreement with the network operator that any traffic caused by any end user with an IP address range between x and y accessing the network operator should be sponsored, and the end user will not be charged for such traffic.

Referring to FIG. 3, 1) the user clicks onto a sponsored data application and submits a service access request, for example, movie.com.

2) the PGW inspects the sponsored data application through the APN.

3) the PGW forwards the sponsored data application to the DPI.

4) the DPI inspects the sponsored data application based on a predetermined policy rule.

5) The DPI transmits a credit control request to the SDCS via the Gy reference point so as to obtain the charging control information of the sponsored data application, for example, charging quota.

6) The SDCS performs a rule for sponsored services: in this case, the sponsored data application is completely sponsored by the third-party service provider.

7) The SDCS returns the credit control response to the DPI, the credit control response including the charging control information.

8) The DPI redirects the service access request to the network device corresponding to the sponsored data application, for example, redirecting it to movie.com.

Figure 4:
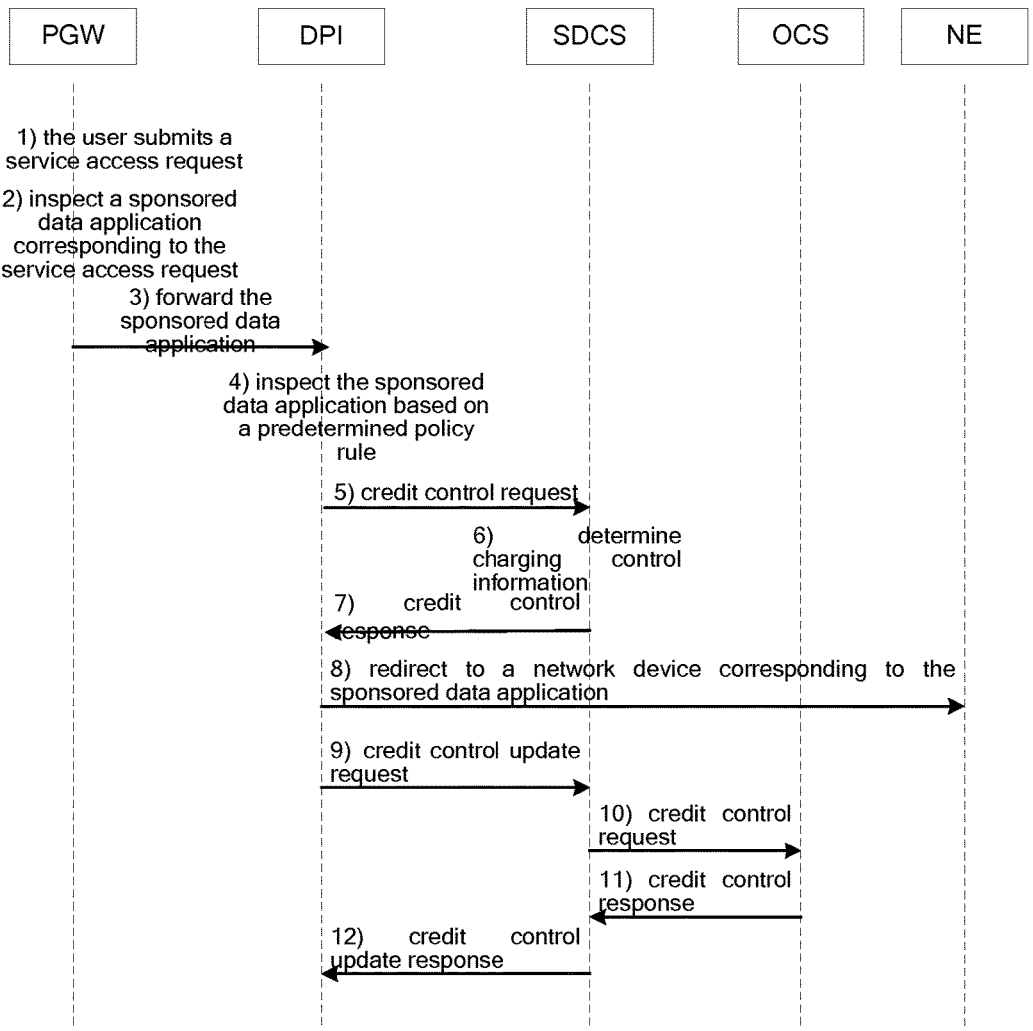
FIG. 4 shows a flowchart of a method for performing charging control to a sponsored data application according to another preferred embodiment of the present invention.

FIG. 4 shows a flowchart of a method for performing charging control to a sponsored data application according to another preferred embodiment of the present invention. FIG. 4 shows the following scenario: the third-party service provider has an agreement with the network operator that for any end user, as long as his/her total traffic use within one month is less than 1 GB, his/her any traffic for accessing the network operator should be sponsored; when the terminal user exhausts the 1 GB traffic, he/she should pay corresponding data service connection fee to the network operator.

Referring to FIG. 4, 1) when the user has exhausted a traffic of 800 MB, his/her then clicks onto a new sponsored data application, for example movie.com.

2) the PGW inspects the sponsored data application through the APN.

3) the PGW forwards the sponsored data application to the DPI.

4) the DPI inspects the sponsored data application based on a predetermined policy rule.

5) The DPI transmits a credit control request to the SDCS via the Gy reference point so as to obtain the charging control information of the sponsored data application, for example, charging quota.

6) The SDCS performs a rule for sponsored services: in this case, computing that the user has exhausted a sponsored traffic of 800 MB, which is lower than 1 GB traffic threshold, with a remaining traffic of 200 MB.

7) The SDCS returns the credit control response to the DPI, the credit control response including the charging control information, for example, the remaining traffic is 200 MB.

8) The DPI monitors the sponsored data application and redirects the service access request to the network device corresponding to the sponsored data application, for example, redirecting it to movie.com.

9) After the remaining traffic of 200 MB is exhausted, the DPI transmits a credit control update request to the SDCS.

10) The SDCS confirms that the traffic use has reached the threshold and transmits a credit control to the OCS such that the OCS performs charging to the non-sponsored data application.

11) The OCS returns the credit control response to the SDCS, the credit control response including the charging control information, for example, charging quota.

12) The SDCS forwards the charging control information to the DPI.

What is claimed is:

1. A method for performing charging control to a sponsored data application based on Policy and Charging Control architecture, wherein the method comprises:

receiving, by a deep packet inspection device (DPI), a service access request submitted by a user;

determining, by the DPI, a sponsored data application of a sponsoring third-party service provider corresponding to the service access request based on a predetermined policy rule;

transmitting, by the DPI, a credit control request to a sponsored data charging device, wherein the credit control request includes identification information of the sponsored data application;

receiving, by the DPI, a credit control response returned from the sponsored data charging device, wherein the credit control response includes the charging control information corresponding to the service access request; and redirecting, by the DPI, the service access request to a network device corresponding to the sponsored data application based on the charging control information, thereby facilitating user access to the sponsored data application.

2. The method according to claim 1, wherein the method further comprises:

determining a trigger condition for transmitting to the sponsored data charging device a credit control update request corresponding to the service access request based on the charging control information;

inspecting whether the trigger condition is satisfied;

transmitting the credit control update request to the sponsored data charging device when the trigger condition is satisfied; and receiving the credit control update response returned from the sponsored data charging device based on the credit control update request, wherein the credit control response includes charging control update information corresponding to the service access request.

3. The method according to claim 2, wherein the trigger condition comprises at least one of the following items:
the user's access to the sponsored data application exceeds a predetermined access time period;
the user's account balance being lower than a predetermined threshold; and
the IP address corresponding to the user being not in a list of allowed accesses.

4. A method for performing charging control to a sponsored data application based on Policy and Charging Control architecture, wherein the method comprises:
receiving a credit control request transmitted from a deep packet inspection device, wherein the credit control request includes identification information of a sponsored data application of a sponsoring third-party service provider;
determining charging control information of a service access request corresponding to the sponsored data application based on a predetermined rule for sponsored services corresponding to the credit control request; and
transmitting a credit control response corresponding to the credit control request to the deep packet inspection device, wherein the credit control response includes the charging control information, thereby facilitating user access to the sponsored data application.

5. The method according to claim 4, wherein the determining comprises any one of the following items:
if the service access request matches the rule for sponsored services, determining the charging control information, wherein the charging control information includes sponsored application charging information corresponding to the sponsored data application; and
if the service access request mismatches the rule for sponsored services, transmitting a credit control request about the charging control information to an OCS, and receiving the charging control information which is fed back by the OCS based on the credit control request.

6. The method according to claim 4, wherein the method further comprises:
receiving a credit control update request transmitted from the deep packet inspection device;
determining charging control update information corresponding to the credit control update request based on the credit control update request in combination with the predetermined rule for sponsored services; and
transmitting a credit control update response corresponding to the credit control update request to the deep packet inspection device, wherein the credit control update response includes the charging control update information.

7. A deep packet inspection device for performing charging control to a sponsored data application based on Policy and Charging Control architecture, wherein the deep packet inspection device comprises:
at least one processor configured as:
a first request receiving module configured to receive a service access request submitted by a user;
an application determining module configured to determine a sponsored data application of a sponsoring third-party service provider corresponding to the service access request based on a predetermined policy rule;
a first request transmitting module configured to transmit a credit control request to a sponsored data charging device, wherein the credit control request includes identification information of the sponsored data application;
a first response receiving module configured to receive the credit control response returned from the sponsored data charging device, wherein the credit control response includes the charging control information corresponding to the service access request; and
a redirecting module configured to redirect the service access request to a network device corresponding to the sponsored data application based on the charging control information, thereby facilitating user access to the sponsored data application.

8. The deep packet inspection device according to claim 7, wherein the deep packet inspection device further comprises:
a trigger condition determining module configured to determine a trigger condition for transmitting to the sponsored data charging device a credit control update request corresponding to the service access request based on the charging control information;
an inspection module configured to inspect whether the trigger condition is satisfied;
a second request transmitting module configured to transmit the credit control update request to the sponsored data charging device when the trigger condition is satisfied; and
a second response receiving module configured to receive the credit control update response returned from the sponsored data charging device based on the credit control update request, wherein the credit control response includes charging control update information corresponding to the service access request.

9. The deep packet inspection device according to claim 8, wherein the trigger condition comprises at least one of the following items:
the user's access to the sponsored data application exceeds a predetermined access time period;
the user's account balance being lower than a predetermined threshold; and
the IP address corresponding to the user being not in a list of allowed accesses.

10. A Packet Gateway (PGW) for performing charging control to a sponsored data application based on Policy and Charging Control architecture, comprising the deep packet inspection device according to claim 7.

11. A sponsored data charging device for performing charging control to a sponsored data application based on Policy and Charging Control architecture, wherein the sponsored data charging device comprises:
at least one processor configured as:
a second request receiving module configured to receive a credit control request transmitted from a deep packet inspection device, wherein the credit control request includes identification information of a sponsored data application of a sponsoring third-party service provider;
a charging control determining module configured to determine charging control information of a service access request corresponding to the sponsored data application based on a predetermined rule for sponsored services corresponding to the credit control request; and a first response transmitting module configured to transmit a credit control response corresponding to the credit control request to the deep packet inspection device, wherein the credit control response includes the charging control information, thereby facilitating user access to the sponsored data application.

12. The sponsored data charging device according to claim 11, wherein the charging control determining module is configured to perform the following operations:

if the service access request matches the rule for sponsored services, determining the charging control information, wherein the charging control information includes sponsored application charging information corresponding to the sponsored data application; and if the service access request mismatches the rule for sponsored services, transmitting a credit control request about the charging control information to an OCS, and receiving the charging control information which is fed back by the OCS based on the credit control request.

13. The sponsored data charging device according to claim 11, wherein the sponsored data charging device further comprises:

a third request receiving module configured to receive a credit control update request transmitted from the deep packet inspection device;

a charging update obtaining module configured to determine charging control update information corresponding to the credit control update request based on the credit control update request in combination with the predetermined rule for sponsored services; and a second response transmitting module configured to transmit a credit control update response corresponding to the credit control update request to the deep packet inspection device, wherein the credit control update response includes the charging control update information.

14. An Online Charging System (OCS) for performing charging control to a sponsored data application based on Policy and Charging Control architecture, comprising the sponsored data charging device according to claim 11.

15. A system for performing charging control to the sponsored data application based on Policy and Charging Control architecture, comprising the deep packet detection device according to claim 7, and a sponsored data charging device or an Online Charging System (OCS) comprising at least one processor configured as a second request receiving module configured to receive a credit control request transmitted from a deep packet inspection device, wherein the credit control request includes identification information of the sponsored data application, a charging control determining module configured to determine charging control information of a service access request corresponding to the sponsored data application based on a predetermined rule for sponsored services corresponding to the credit control request, a first response transmitting module configured to transmit a credit control response corresponding to the credit control request to the deep packet inspection device, wherein the credit control response includes the charging control information.

* * * * *